United States Patent
Uang

(10) Patent No.: US 6,984,339 B2
(45) Date of Patent: Jan. 10, 2006

(54) ANTIFREEZE COMPOSITION

(75) Inventor: Yuh-Jye Uang, Chesterfield, MO (US)

(73) Assignee: Apex Materials Corporation, St. Louis, MO (US)

( * ) Notice: Subject to any disclaimer, the term of this patent is extended or adjusted under 35 U.S.C. 154(b) by 0 days.

(21) Appl. No.: 10/784,644

(22) Filed: Feb. 23, 2004

(65) Prior Publication Data
US 2004/0169156 A1 Sep. 2, 2004

Related U.S. Application Data

(60) Provisional application No. 60/450,436, filed on Feb. 28, 2003.

(51) Int. Cl.
C09K 5/00 (2006.01)

(52) U.S. Cl. .................... 252/70; 71/73; 71/75

(58) Field of Classification Search ............ 252/70, 252/71, 73, 75
See application file for complete search history.

(56) References Cited

U.S. PATENT DOCUMENTS

| 4,587,027 A | | 5/1986 | Preusch et al. |
| 5,079,036 A | * | 1/1992 | Roe et al. ............... 427/212 |
| 5,853,610 A | | 12/1998 | Kaes |
| 6,641,753 B1 | * | 11/2003 | Bloomer ................. 252/70 |
| 6,702,953 B2 | * | 3/2004 | Simendinger et al. ...... 252/70 |

* cited by examiner

Primary Examiner—Necholus Ogden
(74) Attorney, Agent, or Firm—Paul M. Denk

(57) ABSTRACT

Antifreeze agent containing alkylene glycol, chlorine containing inorganic chloride, sweeteners like sorbitol, provides prominent antifreezing point depression effects by use of small volume.

3 Claims, No Drawings

ANTIFREEZE COMPOSITION

CROSS REFERENCE TO RELATED APPLICATION

This non provisional patent application claims priority to the provisional patent application having Ser. No. 60/450,436, which was filed on Feb. 28, 2003.

BACKGROUND OF THE INVENTION

The invention relates to antifreeze agent containing alkylene glycol, inorganic chlorine containing substances, and particularly sweeteners having a polyhydroxy functional group. A composition of antifreeze which provides marked antifreeze effects by the use of small volume.

Antifreeze is a substance that is added to a liquid, usually water, to lower the freezing point of aqueous system and also prevent the formation of solid ice. The antifreeze agents can include inorganic salts such as sodium chloride, magnesium chloride, calcium chloride, potassium acetate, sodium acetate, ammonium phosphate, ammonium nitrate, and such organic compounds as low molecular weight alcohol, glycol, lactates, and urea The present invention relates to antifreeze systems particularly a solution for closed container products in gifts, toys, and medical industry. In recent years, there are more and more commercial products which its design have liquid filled in a closed container such as glass, acrylic, polycarbonate, Polyethylene, polypropylene, polyvinyl chloride, and thermoplastic rubber and the like. The complication associated with the transportation and storage of this water filled products, which can be frozen during the winter, has became a major commercial problem. Acceptable antifreeze must satisfy many requirements. The most essential of these are the ability to lower the freezing point of water to the lowest winter operating temperature, satisfactory of chemical stability and service, minimal effect on materials in contact with antifreeze and usefulness for at least one winter season.

Besides the freezing point lowering effect of such substance in water, the use of antifreeze must take into consideration the corrosion of the agent to the metal surface as well as the environmental effects of such substance. The less expensive and most widely used antifreeze agents have been sodium chloride, calcium or mixtures thereof. However, because of the chlorine content of such substances, when they are brought into aqueous solution, significant corrosion can be observed on ferrous metal or other metal surface. The use of organic antifreeze agents can reduce the danger of corrosion since many organic compounds are significantly less aggressive with the respect to surfaces of different materials and can be more compatible with corrosion inhibitors with respect to metals. However, organic compounds are more expensive than the inorganic salt and simply are not as economical and the organic products have a problem of environmental pollution. Since the antifreeze will be used in consumer product, we use food ingredients in this antifreeze product.

Previously to development of the present invention, water systems exposed to sub-freezing temperatures have been protected by addition of either ethylene glycol or propylene glycol solutions to reduce the freezing and/or solid expansion point of resulting liquid mixture below the lowest extreme of ambient temperature expected. Ethylene glycol however is toxic compared to other available additives and it was prohibited to use in consumer products. Sugar alcohols are readily available, inexpensive materials and are easily processed and these polyols with magnesium chloride have been found to boost the antifreeze effect so that substantially less of it is required for winterizing closed water systems.

U.S. Pat. No. 4,587,027 to Preusch, et al. disclose a antifreeze for potable water requires 12% corn syrup, 30% propylene glycol, 58% water, is effective for freezing and expansion protection down to −45° C. The used amount of propylene glycol is about 30%. U.S. Pat. No. 5,853,610 to Kaes describes a liquid phase which is an aqueous solution of about 3–10% by alkali silicate and about 40% potassium carbonate, can be used in the temperature as low as −30° C. The solid content of the aqueous solution is up to about 40 to 50%.

SUMMARY OF THIS INVENTION

This invention includes an antifreeze composition for a closed liquid container. The composition comprises an effective amount of water-soluble antifreeze agent such as alkylene glycol, dextrose, maltodextrin, sugar alcohol and salt such as alkaline halide, alkaline earth halide. This antifreeze composition provides marked antifreeze effect, which lower freezing point to −10° C. by use only 15% active antifreeze agent with water.

It is contemplated that the antifreeze composition of this invention can be used for a variety of purposes, normally in a setting where a container includes a sealed or closed liquid. For example, this may be used in any type of a item where liquid is embodied within the structure of the device. This can include toys, cushioning devices, water filled pillow, dolls that may have a liquid filling to provide for a softer texture, and the like. Many of these items, may be manufactured in different parts of the world, and may be shipped during the colder winter season. When that occurs, it is desirable to have an antifreeze agent within the liquid, so as to prevent freezing and cracking or breaking of the products in which the liquid is embodied. It is the essence of this invention, and its application and usage.

It is an object of the present invention to provide such small volume of this antifreeze agent to a closed aqueous container, has good freezing depression point, good transparency properties.

It is another object of the present invention to provide good chemical stability, very economical and very environmental friendly product.

Further objects and advantages of the subject invention will be apparent to those skilled in the art.

DETAILED DESCRIPTION OF THE PREFERRED EMBODIMENT

The invention of the novel antifreeze agent comprises (a) from about 0 to about 60 weight percent of alkylene glycol or glycerol and mixtures thereof and (b) from about 0.5 to about 90 weight percent of sweeteners, (c) from about 0.4 to about 60 weight percent inorganic chlorine containing substances, and (d) from about 5.0 to about 98.0 weight percent of water.

The first type ingredient in antifreeze agent is various alkylene glycol compounds and glycerol. The glycols exhibit a low order of toxicity, low vapor pressure at normal temperature and are not an inhalation hazard. Alkylene glycols that can be used in the present invention include diethylene glycol, triethylene glycol, tetraethylene glycol, propylene glycol, dipropylene glycol, 1,3-butylene glycol and various mixtures thereof. Preferred alkylene glycol for use in this invention is propylene glycol. Propylene glycol is a clear, viscous, colorless liquid that is practically odorless and has a slight characteristic taste. The first component of this invention is present in amounts ranging from 0.5 to 50 weight percent based on the weight of the antifreeze agent composition components, preferably from 1.0 to about 30%, and more preferably from about 3.0 to about 12%.

The second type ingredient of antifreeze agent in this invention is the sweetener. The sweeteners can be used in the present invention include sugar alcohols, sucrose, maltodextrin, corn syrup, lactose, maltose and dextrose. Sugar alcohols, or polyols, are chemically alcohols, but are derived from sugar molecules. They include erythritol, hydrogenated starch hydrolysates, isomalt, lactitol, maltitol, mannitol, sorbitol, and xylitol. The mannitol, sorbitol, and xylitol are monosaccharide polyols while the isomelt, lactitol and maltitol are disaccharide polyols. Depend on the different of D.E.(dextrose equivalent), the effect of the freezing depression point is also varied. Both sucrose and starch have zero value of D.E. D.E. values of maltodextrins product is from 5–20. The composition of corn syrup includes dextrose, maltose, and maltotriose. It is divided into four types of corn syrups on the basis dextrose equivalent (D.E.). The type I is from 20 to 38 D.E., type II is from 38 to 58 D.E., type III is from 58 to 73 D.E., and type IV is from 73 D.E. and above. The D.E. value of dextrose is 100. The freezing point depression, lower water activity and inhibition of water crystallization will be increased with increasing DE. The most useful sweeteners compounds include dextrose, corn syrup and sugar alcohol can be utilized in the invention. These three ingredients can help prevent ice crystallization. The dextrose is consisting of low molecular weight polymer of glucose. Dextrose, monosaccharides that is smaller molecule, lowers the freezing point more than disaccharides such as sucrose, which its DE is zero. Also the degree to which the freezing point depressed is function of the amount of dissolved molecules in the solution. The freezing point of 20% of dextrose is –5° C. and at 40% of dextrose, its freezing point is –14° C.

Sugar alcohols are sweeteners among commonly added to depress the freezing point to various degrees. The smaller the molecular weight of the sugar alcohol, the greater the freezing point depression because it is able to dissolve more the smaller molecule and bind up the water. Preferred the sugar alcohols are monosaccharide polyols such as mannitol, sorbitol and xylitol. Mixture of the sweeteners may be employed. Preferred are compositions employing only the sugar alcohol. The sugar alcohol and/or corn syrup, dextrose of the antifreeze agent is present in amounts ranging from 0.5 to about 90 weight percent based on the total weight of the antifreeze agent components, preferably from 10 to about 60%, and more preferably 20 to 45%.

The third type ingredient of antifreeze agent in the invention is chlorinated organic salt. The chlorinated containing substances can be used in the present invention include lithium chloride, sodium chloride, potassium chloride, magnesium chloride and calcium chloride. Among these chlorinated containing salts, the lithium chloride can be worked at coldest temperature while the mixture of the organic salts may be employed. Preferred are compositions employing only the alkaline earth halides. The alkaline earth halide of the antifreeze agent is present in amounts ranging from 0.5 to about 70 weight percent based on the total weight of the antifreeze additive components, preferably from about 20 to about 60 weight percent, and especially preferred is magnesium chloride.

To maximize the best compositions of this invention, a weight ratio between magnesium chloride and sweeteners can be varied from about 1.5:1 to about 1:13. Also the weight ratio between water and sweetener can be varied from about 1:2 to about 2:1. The amount of the third component, propylene glycol, can be varied from about 0 to about 75 weight percent of total weight of mixture of magnesium chloride and aqueous sweetener.

It has been found by actual comparative testing and experimental data that when this novel products and composition prepared in accord with the subject of this invention are used, the sweeteners such as dextrose, sorbitol having shown much lower freezing point depression and greatly improved much more by using chlorine containing substance such as magnesium chloride. The conventional systems at temperature as low as to –20° C., Calcium chloride brines must have a concentration of at least 30% by weight of CaCl2. In practice, the concentrations of such brine should be maintained at about 25% to prevent the risk. Therefore conventional systems can't be used at to –20° C. By comparison, the freezing point of 15% ethylene glycol, 15% of propylene glycol, 15% of sorbitol, 7.5% of magnesium chloride is –6° C., –5° C., –4° C., and –5° C. individually. However, freezing depression point can be down to –10° C. by using 15% of this novel antifreeze agent which containing less than 28% of magnesium chloride, 28% of sweeteners in the total weight of the aqueous water system.

EXAMPLE

General Procedure for Preparation of Composition of Table (1) The water was added into a container, which was agitated and heated to temperature 65° C., and then chlorine-containing substance was slowly added in a small part.
(2) Propylene glycol, or sweetener were added individually in an order at temperature at 60° C.
(3) After the solution was became clear, poured and allowed to cool a package container Using the above procedure, the composition listed in Table 1 were prepared

| Composition (wt %) | 1 | 2 | 3 | 4 | 5 |
|---|---|---|---|---|---|
| Propylene glycol |  |  | 5 | 5 | 10 |
| mannitol | 30 | 10 | 20 |  |  |
| Sorbitol |  | 10 | 20 | 20 | 20 |
| Dextrose |  | 10 |  | 20 | 30 |
| Calcium chloride |  |  | 15 | 15 |  |
| Magnesium chloride | 30 | 30 | 15 | 15 | 30 |
| Sodium chloride |  |  |  |  |  |
| Water | 40 | 40 | 25 | 25 | 10 |

Freezing Point Measurement

A sample solution was vortex tube and immersed in an ice salt bath. Allowed 30 minutes to let the temperature re reach equilibrium. Measurement time is 20 hours and the reading was recorded at very half an hour until the crystal in the tube was observed.

What is claimed is:

1. An antifreeze agent for use in a closed aqueous container holding an aqueous solution for use as a toy, gift, medical product, comprising;

alkylene glycol, wherein said alkylene glycol comprises propylene glycol, having a carbon chain between 3 to 8 carbons, comprising between about 0.5–60% by weight of the agent;

said agent further including inorganic chlorine containing substances;

sweeteners, which have multi-hydroxy functional group; and water;

said sweetener comprising sugar alcohols, consisting of erythritol, hydrogenated starch hydrolysates, isomelt, lactitol, maltitol, mannitol, sorbitol, and xylitol, wherein said sweetener further comprises corn syrup consisting of four types of D. E. grade, said syrup selected from the group consisting of, a type I, of from 20 to 38 D. E., a type II, being from 38 to 58 D. E., a type III, being from 58 to 73 D. E., a type IV, being from 73 D. E. and above, and, a type V comprising dextrose having a D. E. value of 100; wherein said sweetener comprising between about 0.5–90% by weight of the agent; and wherein the weight ratio of the mixture between water and sweeteners can vary from 1:2 to 2:1;

said inorganic chlorine containing substance comprising at least one of lithium chloride, sodium chloride, magnesium chloride, and calcium chloride, and wherein the inorganic chlorine containing substances comprises from about 0.2 to about 70% by weight of the said agent; and wherein the weight ratio between the inorganic chlorine containing substance and the aqueous sweetener can vary from about 1:13 to about 1.5:1.

2. The antifreeze agent of claim 1 and wherein said agent includes;

about 0.5–50% by weight of alkylene glycol, said alkylene glycol comprising a linear carbon chain of between 3 to 8;

about 0.5–90% by weight of sweeteners;

about 0.4–70% by weight of inorganic chlorine containing substances; and about 5.0–50.0% by weight of water.

3. The antifreeze agent of claim 1 and wherein said agent comprising;

about 0.5–10% by weight of propylene glycol;

about 20–50% by weight of sorbitol;

about 50–70% by weight of magnesium chloride; and about 20–40% by weight of water.

\* \* \* \* \*